United States Patent
Mayer et al.

(10) Patent No.: US 11,716,641 B1
(45) Date of Patent: Aug. 1, 2023

(54) SYSTEMS AND METHODS FOR GENERATING SYNTHETIC WIRELESS CHANNEL DATA

(71) Applicant: Rohde & Schwarz GmbH & Co. KG, Munich (DE)

(72) Inventors: Timo Mayer, Munich (DE); Andreas Roessler, Columbia, MD (US)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 17/582,569

(22) Filed: Jan. 24, 2022

(51) Int. Cl.
H04W 24/06 (2009.01)
H04L 1/00 (2006.01)

(52) U.S. Cl.
CPC .......... *H04W 24/06* (2013.01); *H04L 1/0006* (2013.01); *H04L 1/0026* (2013.01)

(58) Field of Classification Search
None
See application file for complete search history.

(56) References Cited

U.S. PATENT DOCUMENTS

| 6,628,724 | B2 | 9/2003 | Bannasch et al. |
| 10,433,254 | B2 | 10/2019 | Sirotkin et al. |
| 11,139,932 | B2 | 10/2021 | Khoryaev et al. |
| 2019/0274108 | A1* | 9/2019 | O'Shea ............. H04W 72/0453 |
| 2020/0280863 | A1 | 9/2020 | Cioffi et al. |
| 2020/0405223 | A1* | 12/2020 | Mai ......................... H04B 1/713 |
| 2021/0160721 | A1* | 5/2021 | Panchal ................ H04W 36/08 |
| 2021/0345370 | A1 | 11/2021 | Lee et al. |
| 2022/0092415 | A1* | 3/2022 | Qiu ....................... G06V 10/751 |
| 2022/0369132 | A1* | 11/2022 | Song ......................... H04B 17/17 |
| 2022/0414449 | A1* | 12/2022 | Aladahalli .............. G06F 18/25 |
| 2023/0079744 | A1* | 3/2023 | Cavatassi ................. G06N 7/01 |

FOREIGN PATENT DOCUMENTS

| KR | 20200069242 A | 6/2020 |
| KR | 20200080145 A | 7/2020 |
| WO | 2020067750 A1 | 4/2020 |
| WO | 2020067754 A1 | 4/2020 |
| WO | WO-2022212253 A1 * | 10/2022 |

OTHER PUBLICATIONS

Minihold, "Versatile RF Fading Simulator", Application Note, Feb. 2015—1MA145-4e, retrieved from https://cdn.rohde-schwarz.com/pws/dl_downloads/dl_application/application_notes/1ma145/1MA145_4e_versatileRF_fading_simulator.pdf, 28 pages.

\* cited by examiner

*Primary Examiner* — Anh H Ly
(74) *Attorney, Agent, or Firm* — Ditthavong, Steiner & Mlotkowski (57) ABSTRACT

The present disclosure relates to a system for generating synthetic wireless channel data. The system comprises: an interface unit for receiving measured wireless channel data; a computing device comprising a first AI unit and a second AI unit to be trained; wherein the first AI unit is configured to transfer the measured wireless channel data into latent space data, and wherein the second AI unit is configured to convert the latent space data into synthetic wireless channel data; and wherein the first AI unit and the second AI unit are trained such that the synthetic wireless channel data resembles the measured wireless channel data; and an analyzer unit which is configured to produce correlation data which represents a correlation between the measured and/or the synthetic wireless channel data and at least one attribute of the latent space data.

18 Claims, 6 Drawing Sheets

SYSTEMS AND METHODS FOR GENERATING SYNTHETIC WIRELESS CHANNEL DATA

TECHNICAL FIELD

The disclosure relates to the generation of synthetic data, in particular by means of neural networks or artificial intelligence systems. More specifically, the disclosure relates to a system and a method for generating synthetic channel data of wireless communication channels.

BACKGROUND ART

New measurement and communication equipment is often tested before its implementation to evaluate the behavior and performance of the equipment. Such tests can be performed by feeding the equipment with data that is provided in the form of test sets or simulation sets.

The test and simulation sets are typically based on measurement data that was recorded by real world measurements or comprise such data, e.g. real world measurements of wireless communication channels. However, often only a limited number of measured datasets is available.

SUMMARY

Thus, there is a need to provide an improved system and an improved method for generating synthetic wireless channel data.

According to a first aspect, the present disclosure relates to a system for generating synthetic wireless channel data. The system comprises an interface unit for receiving measured wireless channel data; and a computing device comprising a first AI unit and a second AI unit to be trained; wherein the first AI unit is configured to transfer the measured wireless channel data into latent space data, and wherein the second AI unit is configured to convert the latent space data into synthetic wireless channel data; wherein the first AI unit and the second AI unit are trained such that the synthetic wireless channel data resembles the measured wireless channel data. The system further comprises an analyzer unit which is configured to produce correlation data which represents a correlation between the measured and/or the synthetic wireless channel data and at least one attribute of the latent space data.

This achieves the advantage that correlations between latent space data and synthetic data (and/or measured data) can be detected. These correlations can be used in a further step to generate further synthetic wireless channel data with specific characteristics, e.g., specific constraints, based on provided latent space data. In this way, synthetic wireless channel data that is tailored for certain test scenarios can be generated.

The measured and/or synthesized wireless channel data can be wireless communication channel parameter data. The measured wireless channel data can be real world data which was generated by a real world measurements in the field.

The system or parts thereof, e.g., the computing device and/or the analyzer unit, can be located on a webserver, a computer or a T&M measurement device.

The analyzer unit can be configured to analyze and/or detect correlations between the latent space data and the synthetic wireless channel data respectively the measured wireless channel data. The analyzer unit can further be configured to produce the correlation data based on the analyzed and/or detected correlations. The analyzer unit can be implemented as software, hardware or a combination of software and hardware. For instance, the analyzer unit can comprise a processing unit.

In an embodiment, the computing device is configured to receive further wireless channel data in a latent space and to mutate said further wireless channel data at least partially based on the correlation data; wherein the computing device is configured to generate further synthetic wireless channel data based on the mutated further wireless channel data in latent space.

The further synthetic wireless channel data can be generated by the second AI unit of the computing device, which can be fed with the mutated wireless channel data in latent space. For instance, the first AI unit is not required to generate the further synthetic wireless channel data and only serves to transfer measured data to latent space data in order to train the second AI unit and/or to produce the correlation data.

In particular, the further wireless channel data in latent space comprises a plurality of datasets, wherein each dataset represents channel characteristics of a wireless communication channel and comprises a plurality of channel attributes. The system can further receive user input defining mutation parameters (mutation constraints). During the mutation the user input can be used as a mutation parameter, e.g. the user input defines at least one attribute which should be boosted, dampened or frozen (i.e. not allowed to mutate) during the mutation. In an example only channel attributes of wireless channel data other than the at least one channel attribute defined by the user input are allowed to mutate. Thereby, the previously detected correlation between the at least one latent space attribute and the synthetic wireless channel data respectively the measured wireless channel data is utilized.

In other words, the computing device can receive a user input and can mutate the further wireless channel data based on the user input thereby taking into account the correlation data.

For example, by only allowing channel attributes other than the inputted channel attribute to mutate, certain constraints can be imposed on the further synthetic wireless channel data (and on any RF signal generated based on the further synthetic wireless channel data). For example, the inputted channel attribute can be a frequency band, such that the generated channel data (and the RF signal) is limited to data within said frequency band. Such a frequency band could be a 0.7 GHz, 2 GHz, 3.5 GHz, 6 GHz, 28 GHz or 60 GHz band. The frequency band can be a millimeter wave band.

In particular, the channel attribute defined by the user input is fulfilled by the generated further synthetic wireless channel data. I.e., the generated further synthetic wireless channel data represents a wireless communication channel with said channel attribute.

In particular, the further wireless channel data is mutated in latent space. The representation of the further wireless channel data in the latent space can be performed using a disentanglement algorithm. Thereby, "disentangled representation" is an unsupervised learning technique that breaks down, or disentangles, each feature into narrowly defined variables and encodes them as separate dimensions.

For example, the analyzer unit can be configured to produce the correlation data based on a disentanglement algorithm. In particular, the disentanglement algorithm may help to detect the correlations between the at least one attribute of the latent space data and the synthetic data.

Latent space may refer to a compressed representation of digital data which was, e.g., generated by an encoder neural network. Latent space data (compressed representation) can comprise latent variable data and/or encoded data.

The generated synthetic wireless channel data (and/or the further synthetic wireless channel data) preferably comprises channel attributes of physical characteristics of a wireless communication channel, in particular a 3G, 4G, 5G or 6G channel. The synthetic wireless channel data (and/or the further synthetic wireless channel data) can be used to simulate a real world wireless communication channel.

Here, mutation may refer to a manipulation and/or modification of certain parameters or attributes of latent space data.

In an embodiment, the at least one attribute of the latent space data comprise at least one dimension and/or at least one parameter of the latent space data.

In an embodiment, the measured wireless channel data and/or the synthetic wireless channel data comprises data in an I/Q format and/or a power delay profile (PDP) format.

A power delay profile (PDP) gives the intensity of a signal received through a multipath channel as a function of time delay. I/Q data is complex data that consists of an imaginary (I) and a real (Q) component. For example, the I/Q data can be an I/Q data stream with a certain sample rate.

The synthetic wireless channel data can be in a different data format than the measured data it is based on. For instance, the measured data is I/Q data and the synthetic data is data according to a power delay profile based on the I/Q data.

In an embodiment, the synthetic wireless channel data comprises data in a PDP format; wherein the second AI unit is configured to generate the data in the PDP format with at least one of the following PDP constraints: a channel length, a format of the PDP, a dynamic of the PDP, a minimization of outliers, a compression function.

In an embodiment, the first AI unit comprises a first trainable neural network, preferably an encoder neural network, and/or the second AI unit comprises a second trainable neural network, preferably a decoder neural network. In particular, data generation/conversion by the first and/or second AI unit is based on a trained algorithm. The first and/or the second trainable neural network can form a convolutional network or be part thereof.

In an embodiment, during a training of the first trainable neural network and/or the second trainable neural network at least one attribute of the latent space data that is generated by the first trainable neural network is fixed. For instance, this allows to predefine which dimensions/parameters are to be present in latent space during training. In this way, a cost function with a certain weighting (with regard to latent space dimensions/parameters) can be predefined for training the first and/or second AI unit.

In an embodiment, the system comprises an optimizer unit which optimizes the parameters of the second neural network such that the synthetic wireless channel data that is generated by the second neural network comprises data according to a specific PDP characteristic.

In an embodiment, the first neural network and/or the second neural network are trained with training data in combination with a PDP model.

In an embodiment, the interface unit is configured to receive the measured wireless channel data from different external sources.

In an embodiment, the computing device is configured to merge measured wireless channel data from the different external sources and to generate the synthetic wireless channel data based on the merged measured wireless channel data. In addition or alternatively, different data models can be used by the computing device to generate the synthetic data.

In an embodiment, the interface unit comprises a network interface which is configured to receive the measured wireless channel data from a communication network together with a user authentication.

In an embodiment, the system further comprises an output unit configured to output the synthetic wireless channel data. The output unit can comprise a further interface.

The output unit can further be configured to output the further synthetic wireless channel data that is produced by the second AI unit based on mutated latent space data. This further synthetic wireless channel data can subsequently be provided as dataset to a user, e.g. for testing communication equipment.

According to a second aspect, the present disclosure relates a method for generating synthetic wireless channel data, the method comprising the steps of:
receiving measured wireless channel data;
transferring the measured wireless channel data into latent space data;
converting the latent space data into synthetic wireless channel data, wherein the synthetic wireless channel data resembles the measured wireless channel data; and
producing correlation data which represents a correlation between the measured and/or the synthetic wireless channel data and at least one attribute of the latent space data.

In an embodiment, the method comprises the further steps of
receiving further wireless channel data in a latent space;
mutating said further wireless channel data at least partially based on the correlation data; and
generating further synthetic wireless channel data based on the mutated wireless channel data in latent space.

In an embodiment, the synthetic wireless channel data comprises data in a PDP format which is generated with at least one of the following PDP constraints: a channel length, a format of the PDP, a dynamic of the PDP, a minimization of outliers, a compression function.

In an embodiment, the measured wireless channel data is received from different external sources.

In an embodiment, the measured wireless channel data is received from a communication network together with a user authentication.

The synthetic wireless channel data and/or the further synthetic wireless channel data generated by the above system and/or method can be used for real word applications. For example, RF signals can be generated based on the synthetic data. These RF signals (e.g., millimeter wave signals) can have characteristics of real word signals and can, e.g., be used to test a device under test, e.g., a mobile telecommunication device or a base station.

BRIEF DESCRIPTION OF THE DRAWINGS

The above described aspects and implementation forms of the present disclosure will be explained in the following description of specific embodiments in relation to the enclosed drawings, in which.

DETAILED DESCRIPTIONS OF EMBODIMENTS

Figure 1:
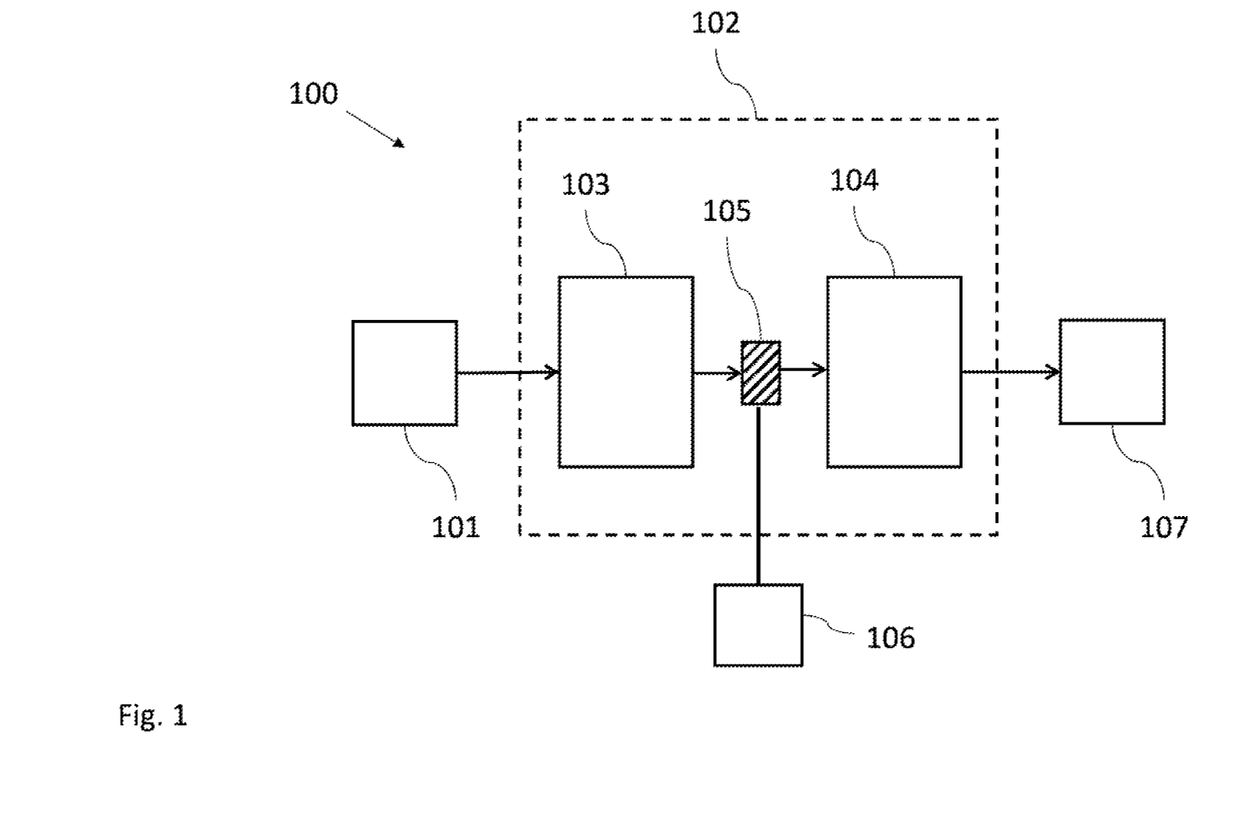
FIG. 1 shows a schematic diagram of a system for generating synthetic wireless channel data according to an embodiment.

FIG. 1 shows a schematic diagram of a system for generating synthetic wireless channel data according to an embodiment;

The system 100 comprises an interface unit 101 for receiving measured wireless channel data, and a computing device 102 comprising a first AI unit 103 and a second AI unit 104 to be trained. The first AI unit 103 is configured to transfer the measured wireless channel data into latent space data 105, and the second AI unit 104 is configured to convert the latent space data into synthetic wireless channel data, wherein the first AI unit 103 and the second AI unit 104 are trained such that the synthetic wireless channel data resembles the measured wireless channel data. The system further comprises an analyzer unit 106 which is configured to produce correlation data which represents a correlation between the measured and/or the synthetic wireless channel data and at least one attribute of the latent space data 105.

The system 100 or parts thereof can form a data conversion unit and the synthetic wireless channel data can be converted channel data. The data conversion unit can be located on a webserver or a computer or a T&M measurement device.

The computing device 102 can comprise a processor that executes the first AI unit 103 and/or the second AI unit 104. The computing device 102 can be an integrated computing unit.

The analyzer unit 106 can be implemented as hardware and/or software and can be configured to analyze and/or detect correlations between the latent space data and the synthetic wireless channel data respectively the measured wireless channel data and to produce the correlation data based on said detection/analysis.

The analyzer unit, for example, uses a disentanglement algorithm to detect the correlations between the latent space representation and the synthetic data. However, also other methods and algorithms can be used by the analyzer unit.

The interface unit 101 can be configured to receive the measured wireless channel data from one or several different external sources. The interface unit 101 can be configured to receive data via a wired or wireless connection (over-the-air). The data can further be uploaded to the interface unit 101 and/or the interface unit 101 can be connected to an RF sensor and directly receive the measured data from said sensor. The interface unit 101 can be a part of a receiver unit of the system 100 which is configured to receive data.

The interface unit 101 can be configured to receive measured data from at least one data source via a network together with a user authentication.

Preferably, the at least one attribute of the latent space data 105 comprises at least one dimension and/or at least one parameter of the latent space data 105.

The synthetic wireless channel data can be in a different data format than the measured data it is based on. For instance, the measured data is I/Q data and the output data is data according to a power delay profile (PDP) based on the I/Q data. However, the measured wireless channel data and the synthetic wireless channel data can also be in the same data format (e.g., I/Q or PDP).

The power delay profile (PDP) gives the intensity of a signal received through a multipath channel as a function of time delay. The time delay is the difference in travel time between multipath arrivals. The abscissa is in units of time and the ordinate is usually in decibels. It is easily measured empirically and can be used to extract certain channel parameters such as the delay spread. I/Q data is complex data that consists of an imaginary (I) and a real (Q) component. For example, the I/Q data can be an I/Q data stream with a certain sample rate.

In an example, the computing device 102 comprises a data preparation unit which is configured to generate a power delay profile based on the received measured data. Thereby, the PDP profile can comprise the at least one out of the following constrains: channel length (length of the power delay profile, tabs); format of the PDP (number of bits, header, payload); dynamic of the PDP; minimization of the outliers; Kompressor function. The data preparation unit can at least partially be formed by the second AI unit 104. The data preparation unit can be configured to replay or adapt reception data.

The computing device 102 can further comprise an adaption unit for adapting data to the power delay profile using at least one neural network. In this way, the synthetic wireless channel data can be generated. The adaption unit can form a black box which is configured to adapt real data to a model data format. The adaption unit can also at least partially be formed by the second AI unit 104.

The system 100, in particular the computing device 102, may further comprise an optimizer unit which optimizes the parameters of the second neural network such that the synthetic wireless channel data that is generated by the second neural network comprises data according to the specific PDP characteristic, e.g. as generated by the data preparation unit. The optimizer unit can be implemented as software in the computing device 102. The optimizer can comprise an Adam Optimizer (Adam Optimization Algorithm).

The first AI unit 103 can comprise a first trainable neural network, preferably an encoder neural network, and the second AI unit 104 can comprise a second trainable neural network, preferably a decoder neural network.

The data generation with the first and/or second neural network is preferably based on a trained algorithm. For this training the measured wireless channel data, e.g. channel sounding data, is required.

The training can be performed on a certain amount of measured wireless channel data in combination with a power delay profile model.

In an example, during a training, the computing device 102 (e.g., data preparation unit) is configured to merge data from different sources or different data models. In this way, Few-Shot-Learning (FSL) can be realized. This allows classifying new data when only a few training samples with supervised information are available. In particular, the following machine learning methods can be used to train the first and/or second neural network: N-Shot Learning (NSL), Few-Shot-Learning (FSL), One-Shot-Learning (OSL), Less-than-One or Zero-Shot-Learning (ZSL).

For example, during a training of the first trainable neural network 103 and/or the second trainable neural network 104 at least one attribute of the latent space data 105 that is generated by the first trainable neural network 103 can be fixed. This allows to predefine which dimensions/parameters are to be present in latent space during training.

The system 100 shown in FIG. 1 further comprises an output unit 107 configure to provide the synthetic wireless channel data, e.g., PDPs as datasets.

The produced correlation data can be utilized to generate further synthetic wireless channel data, in particular via a targeted mutation of further latent space data. Details about this generation of further synthetic data are disclosed below with reference to FIGS. 3-5 below.

Figure 2:
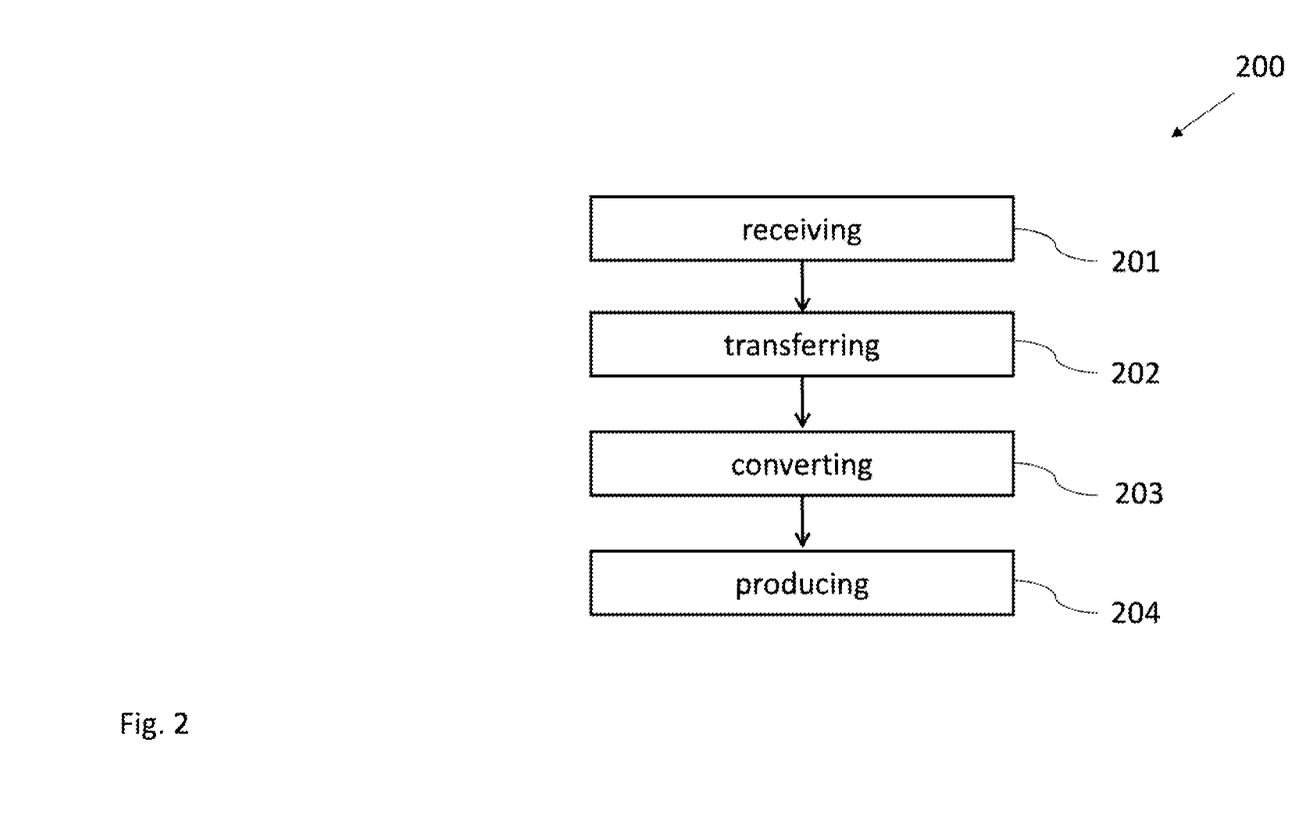
FIG. 2 shows a flow diagram of a method for generating synthetic wireless channel data according to an embodiment.

FIG. 2 shows a flow diagram of a method 200 for generating synthetic wireless channel data according to an embodiment.

The method 200 comprises the steps of:
receiving 201 measured wireless channel data;
transferring 202 the measured wireless channel data into latent space data;
converting 203 the latent space data into synthetic wireless channel data, wherein the synthetic wireless channel data resembles the measured wireless channel data; and
producing 204 correlation data which represents a correlation between the measured and/or the synthetic wireless channel data and at least one attribute of the latent space data.

Preferably, the step of transferring 202 the measured wireless channel data into latent space data is carried out by a first AI unit, e.g. a first neural network, and step of converting 203 the latent space data into synthetic wireless channel data is carried out by a second AI unit, e.g. a second neural network. In particular. In particular, the method 200 can be carried out by the system 100 shown in FIG. 1.

The correlation data can be produced 204 based on an analysis of the latent space data, the synthetic wireless channel data, and/or the measured wireless channel data. During said analysis, correlations between the latent space data and the synthetic and/or measured wireless channel data can be detected. Thereby, a disentanglement algorithm can be used.

The synthetic wireless channel data can comprise data in a PDP format which is generated with at least one of the following PDP constraints: a channel length, a format of the PDP, a dynamic of the PDP, a minimization of outliers, a compression function.

The measured wireless channel data can be received 201 from different external sources. For example, the measured wireless channel data is received 201 from a communication network together with a user authentication.

The method 200 can comprise the further steps of:
receiving further wireless channel data in a latent space;
mutating said further wireless channel data at least partially based on the correlation data; and
generating further synthetic wireless channel data based on the mutated wireless channel data in latent space.

The following FIGS. 3-5 disclose a method 10 and systems 20, 30 for generating such further synthetic wireless channel data (in the following referred to as: synthetic wireless channel data) via a mutation of the further wireless channel data in latent space (in the following: wireless channel data).

Figure 3:
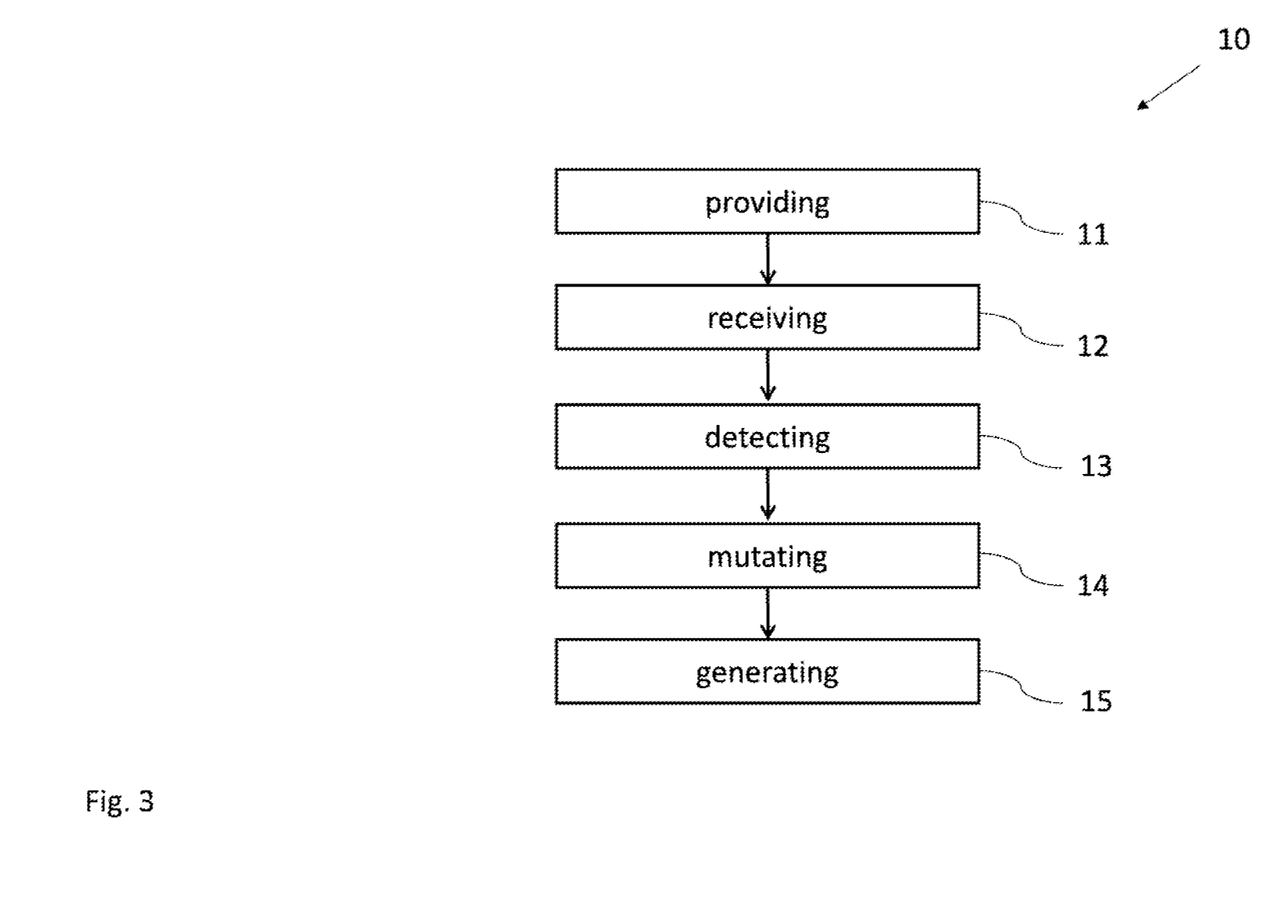
FIG. 3 shows a flow chart of a method for generating synthetic wireless channel data according to an embodiment.

In particular, the steps of the method 10 shown in FIG. 3 can be carried out by the system 100 shown in FIG. 1. The systems 20, 30 shown in FIGS. 4 and 5 can at least partially be identical to the system 100 shown in FIG. 1. In particular, the encoder neural network 22 and the decoder neural network 26 of the system 20 in FIG. 2 can correspond to the first AI unit 103 respectively the second AI unit 104 of the system 100 shown in FIG. 1.

FIG. 3 shows a flow chart of a method 10 for generating synthetic wireless channel data according to an embodiment.

The method 10 comprises the steps of:
proving 11 wireless channel data in a latent space, wherein the wireless channel data comprises a plurality of datasets, wherein each dataset represents channel characteristics of a wireless communication channel and comprises a plurality of channel attributes;
receiving 12 a user input defining mutation parameters;
mutating 14 the wireless channel data, wherein during said mutation the user input is used as a mutation parameter, e.g. the user input defines at least one attribute which should be boosted, dampened or frozen (i.e. not allowed to mutate) during the mutation;
(In an example only channel attributes of wireless channel data other than the at least one channel attribute defined by the user input are allowed to mutate); and
generating 15 synthetic wireless channel data based on the mutated wireless channel data in latent space.

During the mutation 14 of the provided wireless channel data in latent space, the previously detected correlation (i.e., the produced correlation data) between generated synthetic data and the latent space data can be utilized. In particular, the correlation data shows which parameters of the latent space data should be mutated (and how) to generate synthetic data with the specific characteristics defined by the user input.

The wireless channel data can be mutated 14 in latent space. In particular, the wireless channel data is mutated 14 in latent space by manipulating or weighting at least one detected channel attribute in the wireless channel data based on the at least one channel attribute defined by the user input.

The manipulated or weighted latent space data can be fed to a decoder neural network configured to generate 15 the synthetic channel data based on the manipulated or weighted wireless channel data.

The generated synthetic wireless channel data can comprise channel attributes of physical characteristics of a wireless communication channel. The synthetic wireless channel data can be used to simulate a real world wireless communication channel.

The synthetic wireless channel data can be generated 15 based on a neural network algorithm executed by a trainable neural network.

The method 10 can comprise the further optional step of: detecting 13 channel attributes in the wireless channel data.

Figure 4:
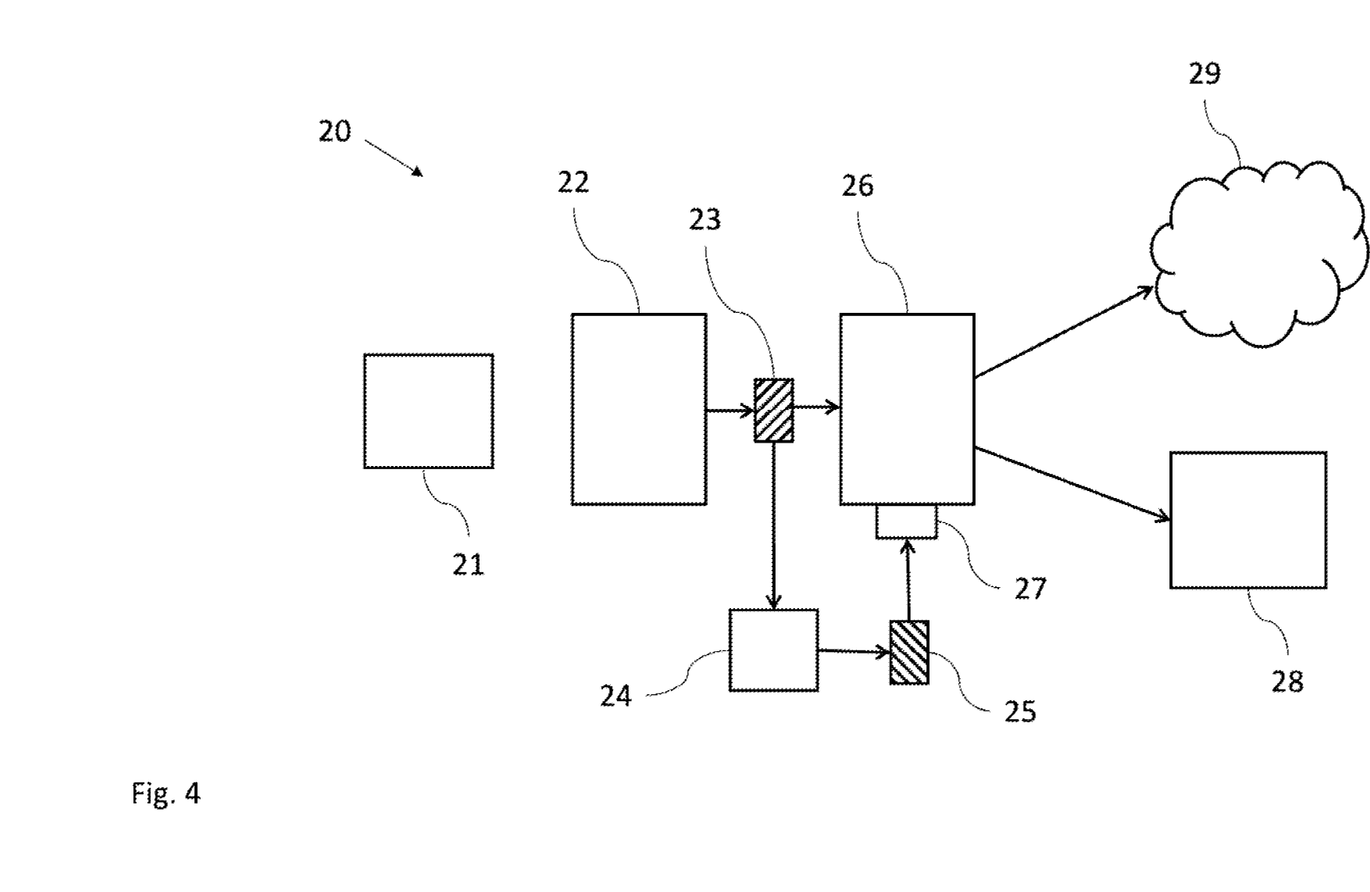
FIG. 4 shows a schematic diagram of a system for generating synthetic wireless channel data according to an embodiment.

FIG. 4 shows a schematic diagram of a system 20 for generating synthetic wireless channel data according to an embodiment.

The system 20 comprises: a user input means 21 and a processing unit 24, wherein the system 20 is configured to receive channel attributes from a user and to forward said attributes to the processing unit 24, wherein said processing unit 24 is configured to execute an algorithm to generate synthetic channel data based on the inputted channel attributes. Said algorithm is trained with training data which comprises channel data and channel attribute data.

Such a system 20 allows deriving synthetic generated (wireless) channel data from measured data, e.g., measured with drive tests. To be flexible, the synthetic data generation can be adjusted or manipulated to generate specific environmental circumstances.

Usually, channel measurement campaigns are driven for a specific frequency (e.g., 2 GHz or 28 GHz). For example, a user who wants to "replay" a measurement in lab may have to restrict to a specific frequency. However, the system 20 allows machine learning based manipulation, wherein a mixture of different frequencies can be supported. In principle, any RF signal can be generated in the lab. Thus, a high flexibility for generating channel sounding data without performing drive tests can be provided and data can be generated fast.

The system 20 can from an AI channel simulator with adjustable data generation unit.

For instance, during the generation of the synthetic channel data only channel attributes other than the attributes received from the user are changed. In other words, the generated synthetic channel data always has the channel attributes which were received from the user, while other channel attributes may vary.

The algorithm makes use of latent space data on the basis of which the synthetic channel data is generated.

In particular, the user input can control the manipulation of latent space data via the user input means 21. The user input means 21 can comprise a scroll bar, slide controller, a wheel, or a switch, button. The user input means 21 can father comprise a graphical user interface. For instance, a digital slide controller can be displayed in the graphical user interface.

The channel attribute can be at least one out of the following: frequency band, outdoor/indoor, UMi/UMa, NLOS/LOS, static mobility, Doppler frequency, velocity, humidity, temperature, interference, rain, jammer, spoofer, position data.

The training data can comprise measured channel data.

The system 20 can comprise an encoder neural network 22. The encoder neural network 22 can be comprised by the processing unit 24.

The training of the algorithm can comprise at least the use of an encoder neural network 22 transforming inputted data in a latent space, i.e. in latent space data 23.

The training of the algorithm may comprise at least a step for identifying channel attributes in latent space in relation to inputted attributes. Preferably, each dimension in latent space represents an attribute from inputted data.

The identification of channel attributes in latent space can be based on a Forced Disentanglement or a Mean Latent Bias algorithm.

The training of the algorithm may comprise an identification of at least one attribute in latent space 23 representing inputted attribute data.

For example, dimensions of the latent space 23 may represent parameters of a measurement data, e.g. of measurement data on the basis of which the latent space 23 was generated.

The user input can comprise a sequence of channel attributes, e.g., a dynamic scenario based on parameter sequences over time.

The system 20, in particular the processor 24, can be configured to weight or manipulate the at least one identified attribute in latent space based on the inputted channel attributes.

The system can further comprise a decoder neural network 26. The decoder neural network 26 can also be a trained neural network. The manipulated or weighted latent space data 25 can be fed to the decoder neural network 26, e.g. via an interface 27. The decoder neural network 26 can be configured to output the synthetic channel data based on this latent space data 25.

The latent space data 25 that is fed to the decoder neural network 26 (i.e., decoder input data 26) can be generated by:

analyzing latent space data 23 generated by the encoder neural network 22, e.g. generated based on training data during a training routine;

detecting correlations between the training data (e.g. a digital dataset) and the latent space data; and generating the decoder input data 25 based on the detected correlation.

Thereby, the processing unit 24 can be configured to generate the decoder input data 25 by superimposing random or pseudorandom data with information based on the detected correlations and further manipulating the thus generated data 25 based on the channel attributes received via the user input. Thus, large datasets of wireless channel data with specific channel attributes, i.e. specific constraints defined by the user input, can be generated based on a limited number of training datasets.

In other words: the encoder input data 25 can not only be generated based on pseudo random or random data. Instead, at least one channel attribute that has to be fulfilled by the synthetic data is determined based on the user input. The user input can be received via graphical user interfaces, e.g. a virtual scroll bar, wheel, switch, button, or position in a map. The user input represents/defines channel attributes that have to be fulfilled by the synthetic data. The user input can, thus, be converted in a manipulation of latent space data (compressed representation) and fed to the decoder 26 with the goal of getting synthetic data according to the constraints defined by the user input.

In a special embodiment, the user input is input position data. Thereby, the position data is converted to environment data using map data (e.g., a digital map and extract object data with position, size . . . ) for input and for training.

A disentanglement algorithm can be used on the latent space data to determine correlations between channel attributes in training data and channel attributes in the latent space data (compressed representation).

The user input can be part of a signal generator or transmitter user input, which is received by the system 20 on the input means 21.

The system 20 can comprise or form a signal generator 28. The generated synthetic channel data can be outputted by means of this signal generator 28, preferably combined with an RF signal and/or with a transmitter representing signal. In particular, the RF signal can be a signal representing a transmitter signal multiplied with channel data, the RF signal can be an output of data representing a transmitter signal multiplied with channel data.

The processing unit 24 can be configured to encrypt the generated synthetic channel data. Such encryption can protect against not authorized or not paid use. A payment system including a decryption of the data, if buying a key, can be foreseen.

The user input can be part of a receiver or a signal/spectrum analyzer. The generated synthetic channel data can be processed with a received signal and forwarded to a processing unit of, e.g., a spectrum analyzer.

The system can further be connected to a communication network 29, e.g. the internet. The user input can be provided from a server connected via a network connection. For instance, the system 20 can comprise a communication interface for connecting to the communication network 29. The communication interface can be a component of the input means 21, or the input means 21 can form a component of the communication interface.

In particular, the generated synthetic channel data is downloadable via the communication network. Preferably, single channel data can be downloaded via the communication network. However, it is also possible that an RF signal multiplied with a channel data can be downloaded. E.g., the RF signal was uploaded beforehand.

In one example, the training of the algorithm is performed on a server connected via the communication network 29.

In particular, the training data can be uploadable to such a network server.

Figure 5:
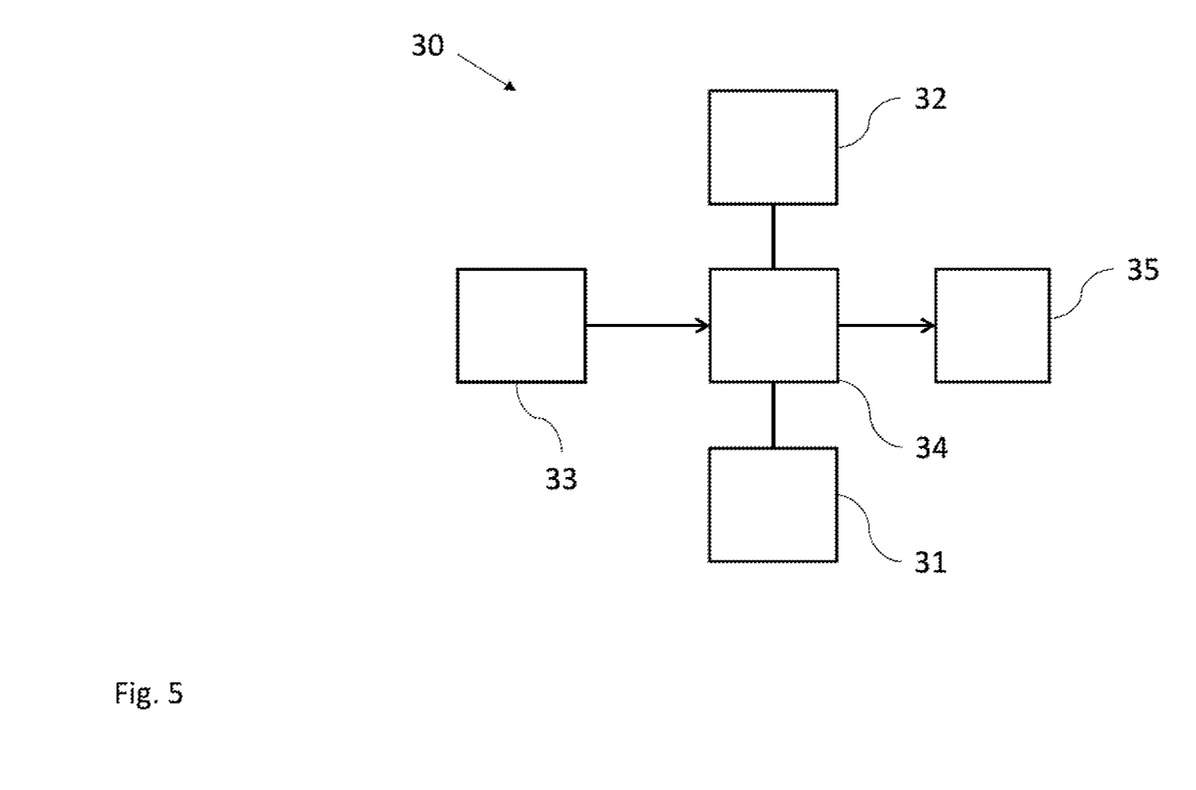
FIG. 5 shows a schematic diagram of a system for generating synthetic wireless channel data according to a further embodiment.

FIG. 5 shows a system 30 for generating synthetic wireless channel data, in particular location dependent channel data, according to a further embodiment.

The system 30 comprises a database 31 configured to store a plurality of wireless channel datasets and/or an artificial intelligence unit 32 trained with such wireless channel datasets, a user interface 33 configured to receive user input defining at least two geographic positions, a processing unit 34 configured to synthesize estimated channel characteristics of a wireless communication channel between the at least two geographic locations either based on the datasets stored in the database 31 and/or by inputting the at least two geographic positions into the artificial intelligence unit 32, wherein the system 30 is configured to output a synthetic wireless channel dataset which comprises channel attributes of physical characteristics of a wireless communication channel.

The system 30 may further comprise an interface 35 for outputting the synthetic wireless channel dataset.

The processing unit 34 can be configured to generate the synthetic wireless channel datasets at least partially based on the estimated channel characteristics. For example, the processing unit 34 is configured to estimate physical objects within an area of interest between the at least two geographic positions based on geo location information, wherein the processing unit 34 is further configured to take said physical objects into account when synthesizing the estimated channel characteristics.

For example, the geo location information can be stored in the database 31 or provided by the artificial intelligence unit 32.

The information on the physical objects can be generated with a trained algorithm, which can be executed by the artificial intelligence unit 32. The generated information can be stored in the database.

The algorithm can be trained with the use of measured channel data, for example comprising position information channel data and/or map data. For example, the measured channel data was measured by a channel sounding technique.

Channel sounding is a technique that evaluates the radio environment for wireless communication. Because of the effect of terrain and obstacles, wireless signals propagate in multiple paths (the multipath effect). To minimize or use the multipath effect, channel sounding can be used to process the multidimensional spatial-temporal signal and estimate channel characteristics. This facilitates simulation and design of wireless system.

Figure 6:
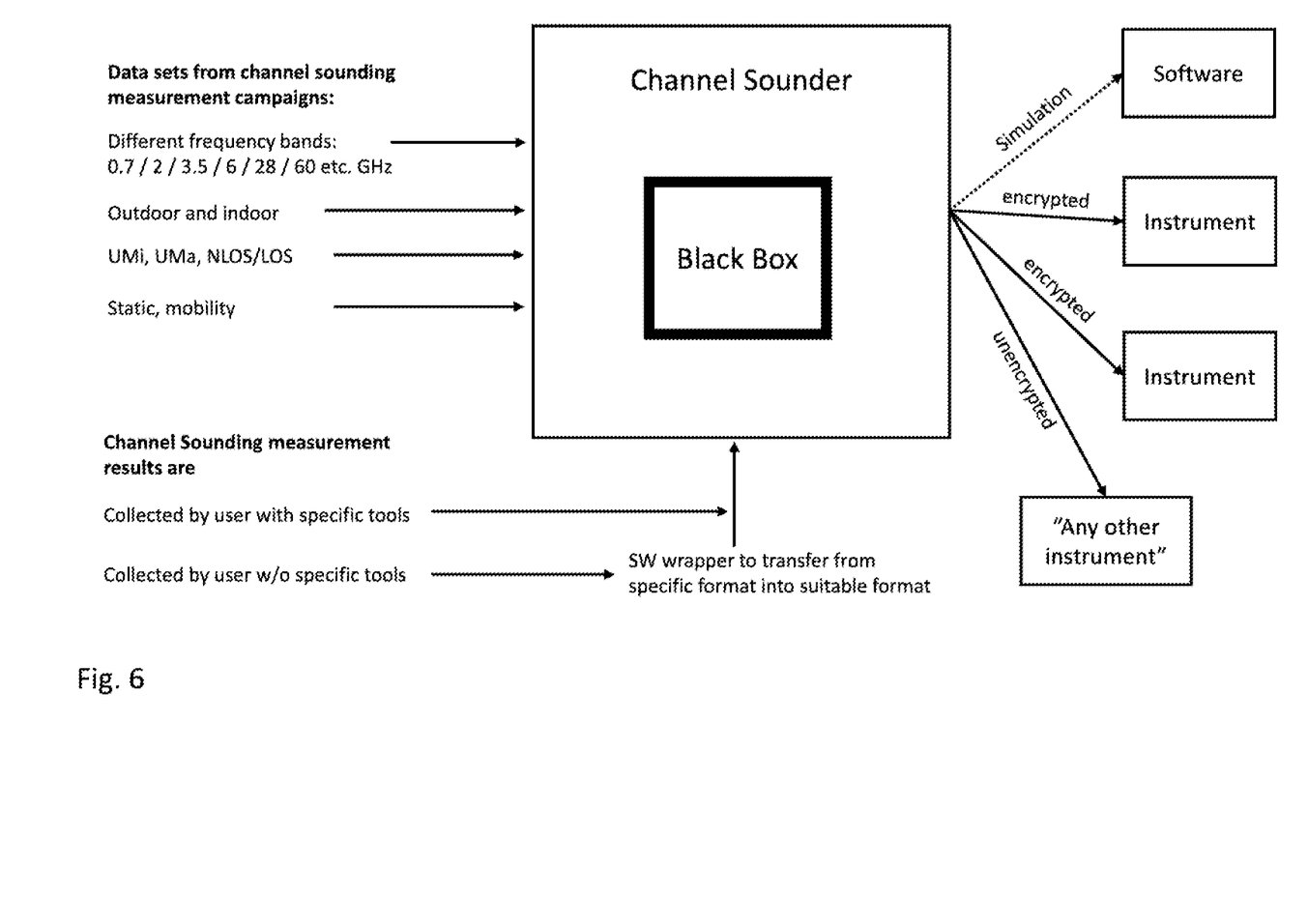
FIG. 6 shows a system according to an embodiment.

FIG. 6 shows a system according to an embodiment. The system can form a map-based channel generator, e.g., for 6G channel sounding.

For example, the channel sounder shown in FIG. 6 can at least partially comprise the system 100 shown in FIG. 1. The data sets from channel sounding measurement campaigns can form the measured wireless channel data on the basis of which the synthetic wireless channel data is generated.

The channel sounder can form a F2L (field-to-lab) systems. The channel sounder allows for a machine learning (ML) based mapping of channel sounding data to machine-type based PDP data. This solves the issue that a channel simulator cannot always be fed directly with the recorded IQ-data of a measurement campaign. Therefore, a mapping of measured IQ data to PDP which can be carried out by the channel sounder based on an ML approach. A customer can directly transfer recorded data to a PDP format. This allows for a better mapping, especially in case of a large quantity of available data, and where data based models are superior to model based models.

All features of all embodiments described, shown and/or claimed herein can be combined with each other.

While various embodiments of the present disclosure have been described above, it should be understood that they have been presented by way of example only, and not limitation. Numerous changes to the disclosed embodiments can be made in accordance with the disclosure herein without departing from the spirit or scope of the disclosure should not be limited by any of the above-described embodiments. Rather, the scope of the disclosure should be defined in accordance with the following claims and their equivalents.

Although the disclosure has been illustrated and described with respect to one or more implementations, equivalent alterations and modifications will occur to others skilled in the art upon the reading and understanding of this specification and the annexed drawings. In addition, while a particular feature of the disclosure may have been disclosed with respect to only one of several implementations, such feature may be combined with one or more other features of the other implementations as may be desired and advantageous for any given or particular application.

The invention claimed is:

1. A system for generating synthetic wireless channel data, the system comprising:
   an interface unit for receiving measured wireless channel data;
   a computing device comprising a first AI unit and a second AI unit to be trained;
   wherein the first AI unit is configured to transfer the measured wireless channel data into latent space data, and wherein the second AI unit is configured to convert the latent space data into synthetic wireless channel data;
   wherein the first AI unit and the second AI unit are trained such that the synthetic wireless channel data resembles the measured wireless channel data; and
   an analyzer unit which is configured to produce correlation data which represents a correlation between the measured and/or the synthetic wireless channel data and at least one attribute of the latent space data.

2. The system of claim 1,
   wherein the computing device is configured to receive further wireless channel data in a latent space and to mutate said further wireless channel data at least partially based on the correlation data; and
   wherein the computing device is configured to generate further synthetic wireless channel data based on the mutated further wireless channel data in latent space.

3. The system of claim 1,
   wherein the at least one attribute of the latent space data comprise at least one dimension and/or at least one parameter of the latent space data.

4. The system of claim 1,
   wherein the measured wireless channel data and/or the synthetic wireless channel data comprises data in an I/Q format and/or a power delay profile (PDP) format.

5. The system of claim 1,
   wherein the synthetic wireless channel data comprises data in a PDP format;

wherein the second AI unit is configured to generate the data in the PDP format with at least one of the following PDP constraints: a channel length, a format of the PDP, a dynamic of the PDP, a minimization of outliers, a compression function.

6. The system of claim 1,
wherein the first AI unit comprises a first trainable neural network, preferably an encoder neural network, and/or
wherein the second AI unit comprises a second trainable neural network, preferably a decoder neural network.

7. The system of claim 6,
wherein during a training of the first trainable neural network and/or the second trainable neural network at least one attribute of the latent space data that is generated by the first trainable neural network is fixed.

8. The system of claim 6,
wherein the system comprises an optimizer unit which optimizes the parameters of the second neural network such that the synthetic wireless channel data that is generated by the second neural network comprises data according to a specific PDP characteristic.

9. The system of claim 6,
wherein the first neural network and/or the second neural network are trained with training data in combination with a PDP model.

10. The system of claim 1,
wherein the interface unit is configured to receive the measured wireless channel data from different external sources.

11. The system of claim 10,
wherein the computing device is configured to merge measured wireless channel data from the different external sources and to generate the synthetic wireless channel data based on the merged measured wireless channel data.

12. The system of claim 1,
wherein the interface unit comprises a network interface which is configured to receive the measured wireless channel data from a communication network together with a user authentication.

13. The system of claim 1,
wherein the system further comprises an output unit configured to output the synthetic wireless channel data.

14. A method for generating synthetic wireless channel data, the method comprising the steps of:
receiving measured wireless channel data;
transferring the measured wireless channel data into latent space data;
converting the latent space data into synthetic wireless channel data, wherein the synthetic wireless channel data resembles the measured wireless channel data; and
producing correlation data which represents a correlation between the measured and/or the synthetic wireless channel data and at least one attribute of the latent space data.

15. The method of claim 14, further comprising the steps of:
receiving further wireless channel data in a latent space;
mutating said further wireless channel data at least partially based on the correlation data; and
generating further synthetic wireless channel data based on the mutated wireless channel data in latent space.

16. The method of claim 14,
wherein the synthetic wireless channel data comprises data in a PDP format which is generated with at least one of the following PDP constraints: a channel length, a format of the PDP, a dynamic of the PDP, a minimization of outliers, a compression function.

17. The method of claim 14,
wherein the measured wireless channel data is received from different external sources.

18. The method of claim 14,
wherein the measured wireless channel data is received from a communication network together with a user authentication.

* * * * *